United States Patent [19]

Petitimbert

[11] Patent Number: 4,470,896

[45] Date of Patent: Sep. 11, 1984

[54] INTERNAL OR EXTERNAL DIELECTRIC DISTRIBUTOR FOR ELECTRODES

[75] Inventor: Jean Petitimbert, Eaubonne, France

[73] Assignee: Le Carbone Lorraine, Gennevillier, France

[21] Appl. No.: 488,067

[22] Filed: Apr. 25, 1983

[30] Foreign Application Priority Data

Apr. 28, 1982 [FR] France .................. 82 07304
Nov. 16, 1982 [FR] France .................. 82 19125

[51] Int. Cl.³ .................. B23P 1/12; B23K 9/16
[52] U.S. Cl. .................. 204/279; 219/69 E; 204/284
[58] Field of Search .................. 204/279, 284, 224 M; 219/69 E, 69 D, 69 R

[56] References Cited

U.S. PATENT DOCUMENTS

| | | | |
|---|---|---|---|
| 3,219,568 | 11/1965 | Wilkinson | 204/224 M |
| 3,293,166 | 12/1966 | Cowing | 204/284 X |
| 3,346,476 | 10/1967 | Secunda | 204/224 M |
| 3,468,784 | 9/1969 | Joyce et al. | 204/284 X |
| 3,793,170 | 2/1974 | Andrews | 204/224 M X |
| 4,210,507 | 7/1980 | Davidson et al. | 204/284 X |

FOREIGN PATENT DOCUMENTS

| | | | |
|---|---|---|---|
| 2313813 | 10/1973 | Fed. Rep. of Germany | 219/69 E |
| 1470569 | 1/1967 | France | |
| 2200771 | 4/1974 | France | |
| 43-19656 | 8/1968 | Japan | 219/69 D |
| 698733 | 11/1979 | U.S.S.R. | 219/69 R |

Primary Examiner—Donald R. Valentine
Attorney, Agent, or Firm—Albert F. Kronman

[57] ABSTRACT

A distributor for dielectric liquid adapted for positioning in the irrigation or degasing round holes of machining electrodes having a body either shaped to obturate the opening or square shaped so as to leave free spaces between it and the walls of the holes. In both versions the body has an axial channel and in the first at least one slot communicating with the channel is provided with the slitted end in the working zone of the electrode. The second embodiment, useful in small electrodes, has a square body whose diagonal length is equal to the diameter of the opening in which it is to be force-fitted with the distribution of dielectric taking place through spaces left between the body and the walls of the opening.

8 Claims, 8 Drawing Figures

INTERNAL OR EXTERNAL DIELECTRIC DISTRIBUTOR FOR ELECTRODES

BACKGROUND OF THE APPLICATION

This application is a combined Application based on a French application for Letters Patent entitled INTERNAL OR EXTERNAL DIELECTRIC DISTRIBUTOR FOR ELECTRODES filed Apr. 28, 1982, No. 82,07304 and an application of First Certificate of Addition filed Nov. 16, 1982, No. 82,19125 by the applicant. Both dates are relied upon and claimed under the Convention.

FIELD OF THE INVENTION

The present invention relates to a distributor of dielectric liquid adapted for positioning in the irrigation or degasing openings drilled in certain electro-discharge electrochemical machining electrodes.

As wellknown in this art, supply of dielectric to a work zone can be effected through openings in the electrodes which also can have degasing openings.

Such openings disadvantageously can leave on the machined work pieces cores or needles which, during their formation destabilize the operation, thus decreasing efficiency of production and further requiring their elimination by an additional machining operation.

It is also known in the art that certain electrodes used for making small openings have very small or spiral channels to avoid the formation of cores.

These solutions are disadvantageous. With small diameter channels the avoidance of cores is at the cost of substantial amounts of dielectric, necessitating a precise control of dielectric because of losses of charge. Moreover, this expedient is limited in applicability to metallic electrodes. With spiral channels, the formation of cores is eliminated but a type of "dome" remains on the machined objects which must be removed by further machining.

PATENT INFORMATION STATEMENT

French Pat. No. 2,200,771 describes electrodes for electrolytic machining equipped with means for regulating the flow of electrolytic fluid irrigating a cavity in a work piece proportionally to the position of the electrode relative to the workpiece and to the penetration of the electrode in this cavity.

French Pat. No. 1,470,569 describes an electrode having a conductive body traversed by an axial fluid passage with a conductive tip fixed on the body across the front thereof, which tip has a rearwardly inclined working surface with a pointed front end, a series of small diameter openings being distributed on the surface of this tip and passing therethrough to communicate with the fluid passage. An insulating layer covers the body behind the tip.

Neither of these patents hints at or suggests the present invention.

OBJECTS AND SUMMARY OF THE INVENTION

The main object of this invention is to avoid by simple means the formation of cores or needles on articles machined with electrodes provided with irrigation and/or degasing holes regardless of the size, shape and nature of these electrodes without altering their normal operation.

This object is attained by the invention in a dielectric liquid distributor intended for positioning i the irrigation and/or degasing holes of electrodes used in electro-discharge machining apparatus, which distributor is formed of a body having a shape resembling that of the hole in which it can be force-fitted and comprising a dielectric distribution system including a central channel of small diameter d along part $l_2$ of its length L and issuing at one of its extremities.

One or more slots pass through the axis of the body starting from its other extremity and extending to its sides, the width of the slots being less than d and their length $l_1$ greater than L less $l_2$, the distributor being inserted in the opening in such a way that the end having the slots is in the work zone of the electrode.

The length L of the distributor is equal to or less than that of the opening for which it is intended.

The width a of the slots is selected so as to be as small as possible and about twice the working gap.

The number of slots is determined by the volume of charge to be distributed. Their total section must be compatible with this volume. There number can only be one.

DISCLOSURE OF BEST MODE

Figure 1:
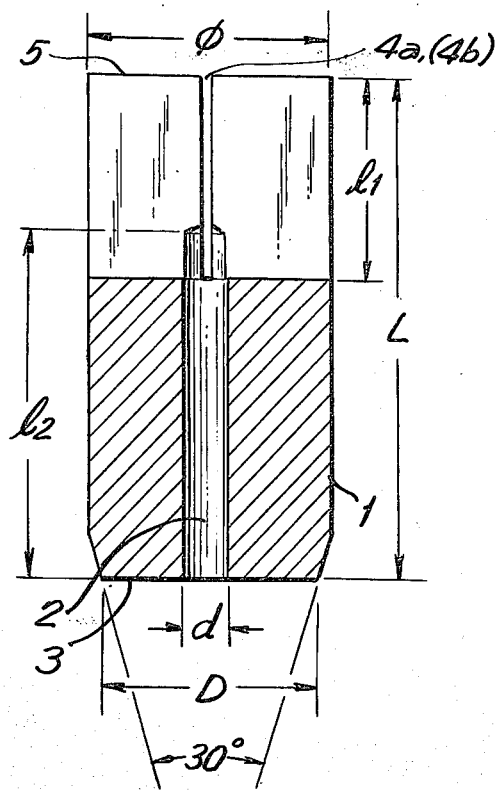
FIG. 1 is a cross-sectional view of the distributor of the invention according to one embodiment.
Figure 2:
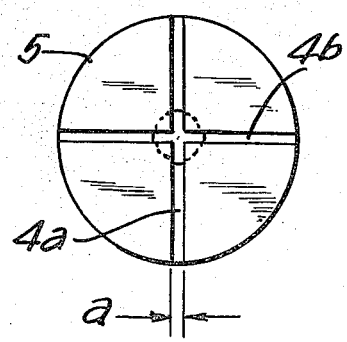
FIG. 2 is a top plan view thereof.

Referring descriptively to the drawing and particularly to FIG. 1, there is shown one form of the inventive dielectric distributor as constituted by a body of length L and diameter $\phi$ which is substantially equal to the diameter of the hole in which the distributor is to fit.

Body 1 is traversed by channel 2 whose diameter is d along length $l_2$ which terminates at the end 3 of the body.

Two slots 4a and 4b in the shape of a cross begin at the other end 5 of the body a along a distance $l_1$ and have width a.

Body 1 is shown as having a front bevel (angle 30°, diameter D) to facilitate insertion in the hole. But this is not critical, for the distributor can be simply force-fitted in the hole. It can also be secured to the electrode by any other suitable means such as by cementing or screwing threaded bodies in threaded holes or the like.

Figure 3:
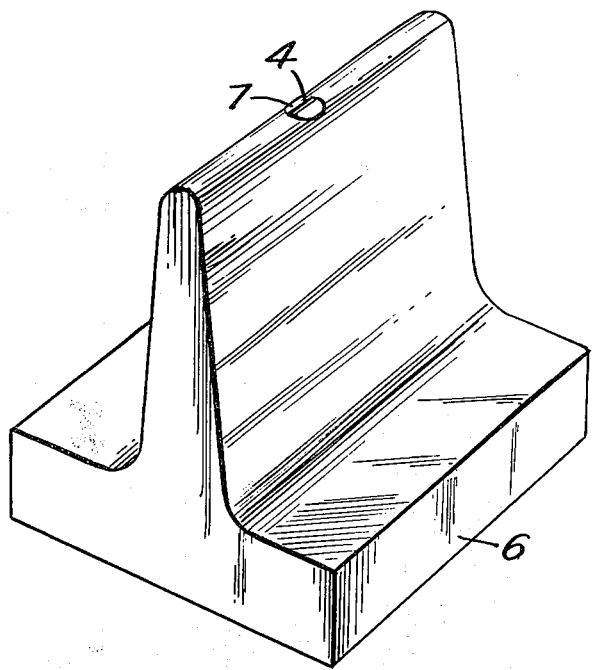
FIGS. 3, 4, and 5 are perspective views of differently shaped electrodes to which one or more of the distributors of FIGS. 1 and 2 can be adapted.

In FIG. 3 is shown an electrode 6 for use on the rib of the foundry pressure mold which has been fitted with a distributor 7 with a single slot 4.

Figure 4:
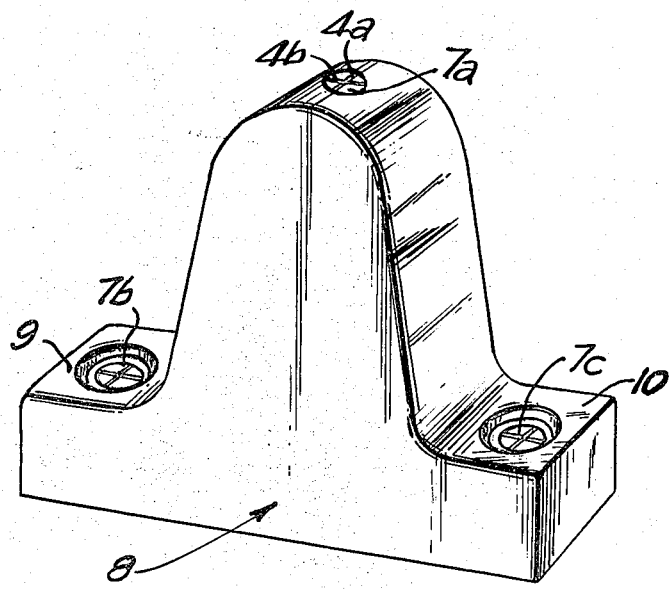

FIG. 4 shows another electrode 8 for a stamping matrix equipped with several distributors 7a, 7b, 7c formed with slots 4a, 4b. The distributors 7b and 7c are inserted respectively in the projections 9 and 10 of the electrode.

Figure 5:
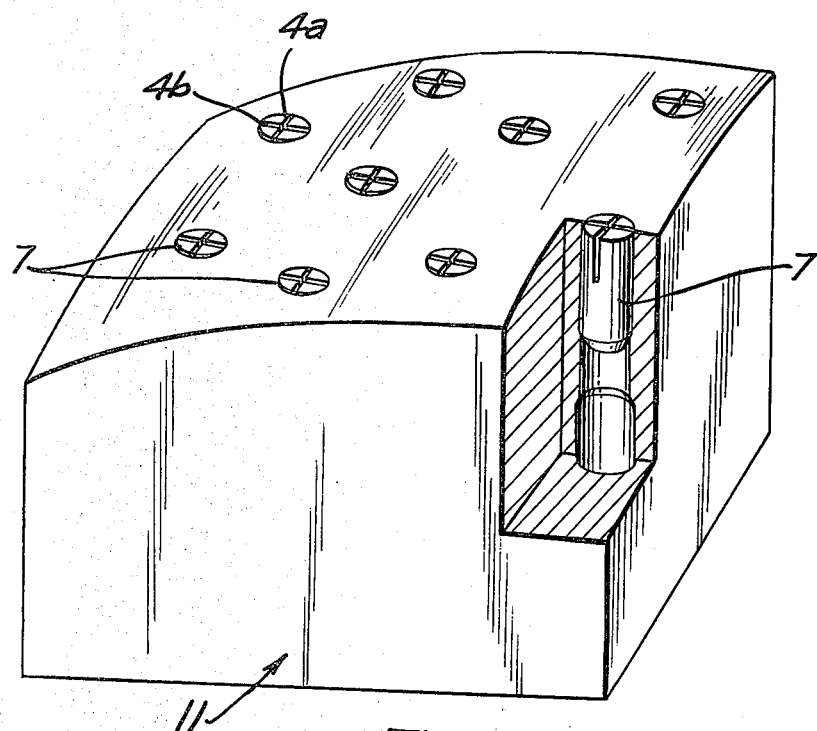

FIG. 5 shows a part of an electrode 11 for use with a plastic mold with several distributors, each formed with two cross-shaped slots 4a and 4b. One of the distributors is shown in position in a cutaway section of the figure.

It is evident that the invention finds utility also with large electrodes greater than one square meter. These generally has several irrigation or degasing holes in each of which can be inserted the appropriate distributor.

Advantageously, the dielectric fluid distributor of the invention can be installed by any user.

Certain electrodes have irrigation or degasing holes which have a relatively small diameter, for example, between 1 and 3 mm to facilitate removal of the core left on the piece to be machined, the invention is applicable also to those electrodes. It is sufficient for the user to enlarge the diameter of the holes on part or the whole of their length to place distributors therein. The user will then no longer have to remove cores.

By way of example, the following table gives in mms the dimensions of various distributors according to the invention, the width a of the slots being around 0.2 mm.

|   | N°1 | N°2 | N°3 |
|---|---|---|---|
| ∅ | 3 | 6 | 10 |
| D | 2 | 5 | 9 |
| d | 1,1 | 2 | 4 |
| L | 12 | 15 | 20 |
| $l_1$ | 5 | 6 | 8 |
| $l_2$ | 9 | 11 | 14 |

An additional advantage of this invention is that the present distributor can be used with any electrode material such as graphite, copper, copper-tungsten alloy, etc. It suffices that the distributor be of the same material in order that it have the same behavior as the electrode material as regards wear and flow.

Figure 6:
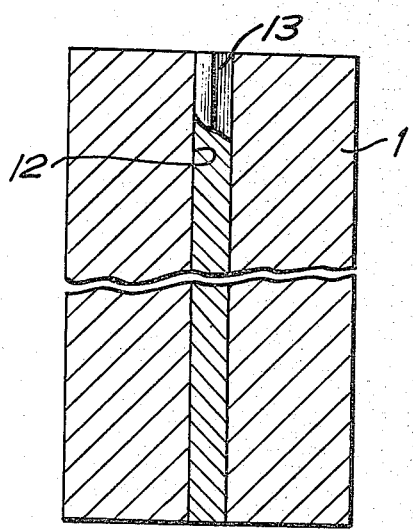
FIG. 6 is a cross-sectional view of an electrode with another embodiment of the invention featuring external distribution of liquid dielectric.
Figure 7:
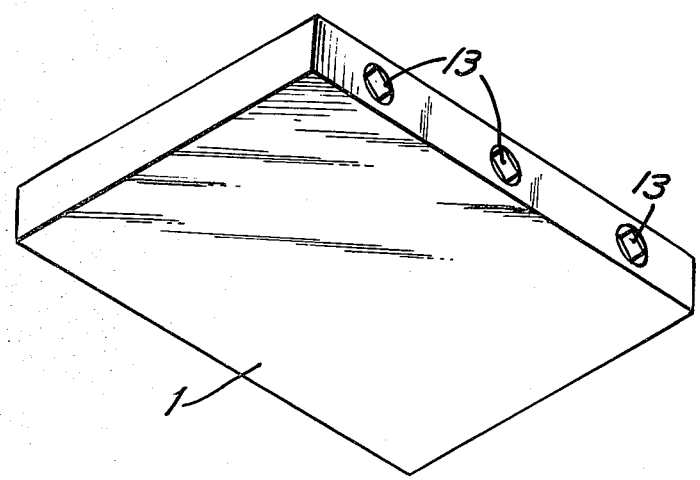
FIG. 7 is a top plan view of the electrode of FIG. 6.
Figure 8:
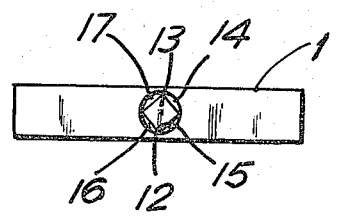
FIG. 8 is a perspective view of an electrode with mulitple dielectric distributors in accordance with the invention.

The embodiment of FIGS. 6–8 is adapted for use with electrodes which have irrigation or degasing holes of small diameter. Drilling of such holes is generally difficult, especially in long electrodes.

In this embodiment, the body of the distributor is solid and square with a diagonal length equal to the diameter of the hole it fits, and the distribution of the liquid dielctric to be supplied to the holes takes place externally thereof through free spaces between the body of the distributor and the walls of the hole.

As shown in FIGS. 6 and 7, electrode 1 has a bore 12 in which is force-fitted a distributor 13 whose square body has a diagonal having a length about equal to the diameter of bore 12. Distribution of liquid dielectric takes place through free spaces 14, 15, 16 and 17.

As an example of the invention, a 50 mm long, 12 mm wide, 2 mm thick electrode requires for optimum operation an irrigation bore 0.4 mm in diameter. Owing to the dimensions of this electrode, drilling of a bore of this size is delicate.

Instead of drilling a bore 0.4 mm, there is made a bore 1.4 mm in diameter and a distributor according to this form of the invention is force-fitted therein. The operation of the resulting electrode is as good and sometimes better than one which has a 0.4 mm bore.

This embodiment has the same advantages as the preceding one.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive to the invention, the scope of which is defined in the appended claims and that all modification that come within the meaning and ranges of equivalency of the claims are intended to be included therein.

What is claimed is:

1. A distributor for dielectric liquid adapted for positioning in the irrigation and/or degasing hole of a machining electrode, said hole having a given diameter and shape, comprising a body adapted to fit in said hole, a central channel in said body, said body being either of a size and shape as to fit in said hole while leaving liquid passages between it and the walls of said hole with said channel extending therethrough or being so dimensioned as to close said hole with said central channel extending therethrough from one end of said body and at least one substantially straight slot communicating with said channel and extending from the other end of said body and issuing on the side thereof, said slot having a smaller diameter than said channel, said body being of the same material as said electrode.

2. The distributor of claim 1 wherein the end of said body opposite said slot is beveled.

3. The distributor of claim 1, wherein said body is of graphite-copper or a copper-tungsten alloy.

4. An electrode for electro-discharge machining having irrigation and/or degasing holes and in said holes a distributor as claimed in claim 1.

5. The electrode of claim 4 wherein said distributors are force-fitted in said holes.

6. The electrode of claim 4 wherein said distributors are cemented in said holes.

7. The electrode of claim 4, wherein said distributors are screwed in said holes.

8. The distributor as defined in claim 1 having a pair of cross-shaped slots.

* * * * *